March 8, 1966　　　G. FARAGO　　　3,239,730
VARIABLE CAPACITOR
Filed April 16, 1964
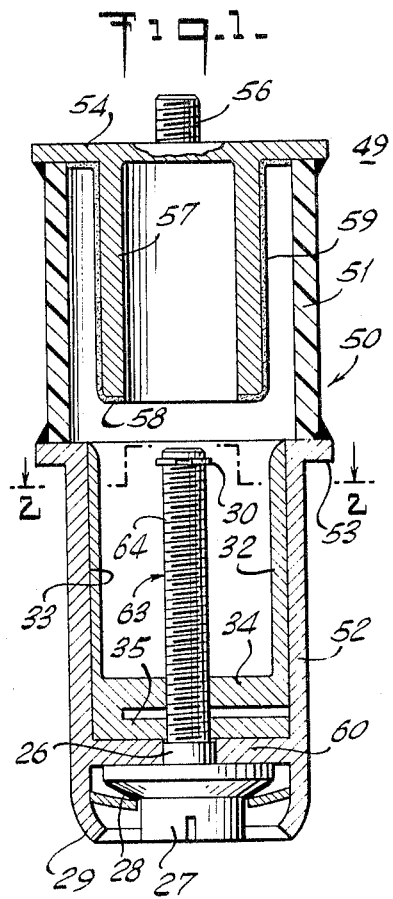
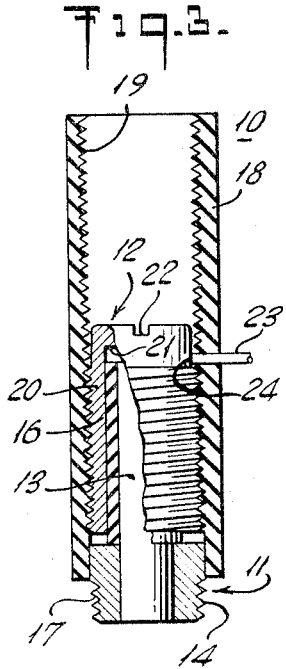
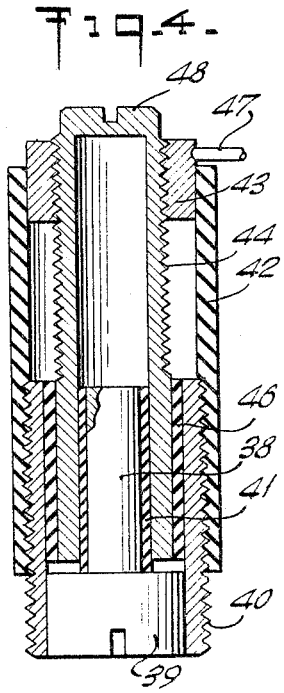
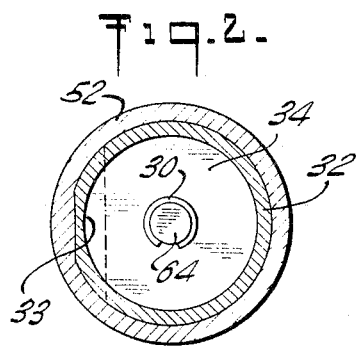
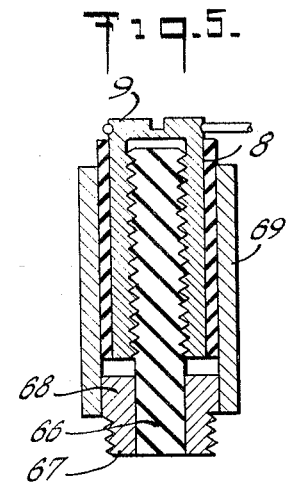
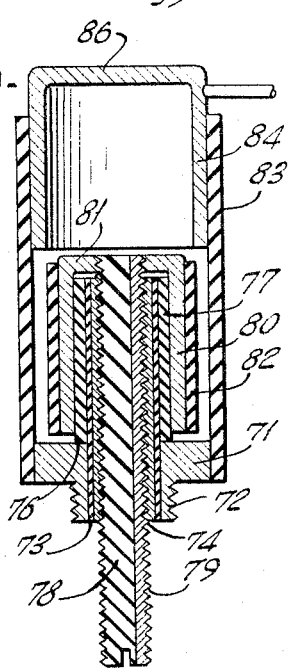
INVENTOR
GEORGE FARAGO
BY Stanley Wolder
ATTORNEY United States Patent Office 3,239,730
Patented Mar. 8, 1966

3,239,730
VARIABLE CAPACITOR
George Farago, New York, N.Y.
(206 E. 37th St., Brooklyn, N.Y.)
Filed Apr. 16, 1964, Ser. No. 360,204
12 Claims. (Cl. 317—249)

The present application Serial No. 360,204 filed April 16, 1964, is a continuation-in-part of the former copending patent application of George Farago, Serial No. 143,229 filed October 5, 1961, now abandoned.

The present invention relates generally to variable capacitors and it relates more particularly to those types of variable capacitors known as coaxial or concentric tubular capacitors.

Concentric cylinder trimmer capacitors are generally used in high and ultra-high radio frequency circuits as part of a frequency determining network. They may be used for trimming or padding, in which case the capacitor is set to a given value and left alone thereafter unless recalibration is required; and for tuning, in which continuous adjustment is required.

Concentric cylinder trimmer capacitors now in use are generally made of a cylinder or tube of dielectric material usually glass or ceramic and sometimes of plastic. The fixed electrode is usually made by metalizing part of the outer surface of the dielectric tube. The movable electrode being a metal piston movable along the inner length of the tube, usually by a screw thread attached to the center of one end of the piston. The capacitance is determined by the length of piston included within the metalized area constituting the fixed electrode.

Some of the major requirements of trimmer capacitors are: small size for any given capacitance and breakdown voltage; minimum series inductance; highest possible range of capacitance; vibration and shockproof construction; high Q factor; maximum electrical stability; low manufacturing cost; freedom from breakage in use; and protection from environmental influences.

Trimmer capacitors now being made do not in general meet all the above requirements. In particular, due to the limits of present production methods, the dielectric cylinders being used are generally non-uniform in cross section and vary in wall thickness along the length thereof. As a consequence there is a varying air gap between the inner electrode and the dielectric cylinder which is not controllable, and which can become a site for moisture and contamination to collect effecting the electrical characteristics of the capacitor. Also, since the dielectric cylinder supports one of the electrodes, the wall thickness must be comparatively large to insure mechanical strength. This has the effect of decreasing the maximum capacitance, and of increasing dielectric losses.

It is thus a principal object of the present invention to provide an improved electrical component.

Another object of the present invention is to provide an improved variable capacitor.

Still another object of the present invention is to provide an improved trimmer capacitor having a high capacitance to size ratio.

A further object of the present invention is to provide an improved compact trimmer capacitor of high stability and low noise factor and capable of being uniformly and precisely adjusted.

Still a further object of the present invention is to provide an improved capacitor of the above nature characterized by its ruggedness, low cost and superior electrical properties.

The above and other objects of the present invention will become apparent from a reading of the following description taken in conjunction with the accompanying drawing, wherein:

FIGURE 1 is an enlarged longitudinal sectional view of a trimmer capacitor embodying the present invention;

FIGURE 2 is a sectional view taken along line 2—2 in FIGURE 1;

FIGURE 3 is a longitudinal sectional view of another embodiment of the present invention;

FIGURE 4 is a longitudinal sectional view of still another embodiment of the present invention;

FIGURE 5 is a longitudinal sectional view of a further embodiment of the present invention; and FIGURE 6 is a longitudinal sectional view of still a further embodiment of the present invention.

An important feature of the present invention is the manner in which the dielectric material is associated with the coaxial cylinder and piston electrodes and the manner of adjustment of these electrodes. The precision fabrication of metal cylinders and pistons by present techniques is a simple and relatively inexpensive procedure. A tubular cylinder and an associated piston may be easily formed to very close tolerances. It is also a conventional procedure to form on metal surfaces adherent coatings of dielectric materials, such as glass, ceramic and many of the synthetic organic resins. These coatings may be formed to very close tolerances either directly or by subsequent machining or treatment. The result is a variable coaxial capacitor of high precision in which the dielectric coating adheres to the piston electrode and slidably uniformly contacts and engages the cylinder electrode. Sites for moisture, and contaminants between the electrodes are virtually eliminated. Furthermore, since the dielectric coating is firmly supported by the rigid piston it may be made very thin thereby greatly reducing the size to capacitance ratio and greatly increasing the range of adjustment. This advantage may be likewise achieved by coating the inner face of the cylinder with the dielectric material. In a sense the present invention contemplates the provision of a variable capacitor comprising a tubular cylinder member having an electrically conducting inner face defining a first electrode, a piston member slidably registering with said first electrode and including a cylindrical core having an electrically conducting peripheral face coaxial with said first electrode and a layer of dielectric material adherent to said core peripheral face and sandwiched between said first and second electrodes, a longitudinally extending screw member coaxial with said electrodes and a threaded follower engaging said screw member, said cylinder member and piston member being longitudinally rigidly connected to said screw member and said follower whereby relative longitudinal movement between said cylinder member and said piston member is effected only by relative rotation between said follower and said screw member.

Another important feature of the present invention which greatly contributes to the stability and superior characteristics of the present capacitor resides in the provision of means for restricting the relative rotation between the piston and cylinder members so that the only movement which accompanies the adjustment of the capacitor is a relative longitudinal sliding movement. A further feature by which additional improvements in operation are achieved is the relative dimensioning of the piston and cylinder members whereby the dielectric material which is advantageously resilient is under radial compression when these members are in telescoping registry. This not only results in superior electrical properties but also serves as a resilient and cushioned mechanical coupling between the electrodes which together with the other electrode supports provides for a highly shock and vibration resistance device.

Referring now to the drawing and more particularly to FIGURES 1 and 2 thereof, which illustrate a preferred embodiment of the present invention, the reference numeral 49 generally designates the improved variable capacitor which comprises a hollow body member 50 including an upper tubular section 51 formed of glass or other suitable rigid insulating material and a tubular coaxial lower section 52 preferably formed of metal. The upper end of the lower section 52 is provided with a peripheral flange 53 abutting and hermetically sealed to the lower end of the upper section 51.

A circular metal end plate 54 rests on and is rigidly and hermetically sealed to the upper end of the upper tubular section 51 and is provided with a coaxial upstanding integrally formed stud 56 which facilitates the mounting of the capacitor 49 or serves as one of the terminals thereof. Depending from the underface of the plate 54 and integrally formed therewith is a first cylindrical electrode 57 which although illustrated as being of tubular construction may be solid as well. The first electrode 57 is coaxial with the body member 50 and is spaced inwardly of the upper section 51 and terminates at a level shortly above the top of the lower section 52. The lower outer peripheral edge 58 of the electrode 57 is curved and downwardly inwardly tapered.

A thin uniform coating or layer 59 of a non-polar dielectric material covers and is firmly adherent to the outer peripheral surface of the electrode 57 and the tapered edge 58 and the underface of the plate 54 between the electrode 57 and the tubular section 51. The coating 59 is preferably a synthetic organic polymer, for example a polyolefin and is advantageously a fluorinated polyolefin such as polytetrafluoroethylene or the like. The dielectric material should have a very low dielectric loss factor even at extremely high frequencies and is advantageously of a compressible resilient nature and preferably self lubricating. The polyolefins, and particularly the fluorinated polyolefins satisfy these requirements. The layer 59 is applied in any conventional and suitable manner well known in the art whereby to effect a coating of uniform thickness, the thickness depending on the desired maximum capacitive value of the device. Since the bore of the electrode 32 and the outer surface of the electrode 57 which serves as a base for the dielectric coating 59 can be easily formed to very close tolerances, a capacitor of great precision and stability can be produced.

The lower tubular section 52 has an end wall 60 integrally formed therewith a short distance above the bottom of the section 52, the wall 60 being provided with a circular central opening. An adjusting or central screw 63 is coaxial with the body member 50, being journalled to the end wall 60. The screw 63 includes a threaded coaxial shank 64 extending to about the upper level of the tubular section 52 and terminates in an enlarged cylindrical base 26 rotatably engaging the opening in the end wall 60. An enlarged slotted head 27 is provided on the screw 63 below the base 26 and is provided with a flat upper face bearing on the underface of the end wall 60 and a downwardly facing inclined peripheral shoulder 28. The lower border 29 of the tubular section 52 is inwardly upset to delineate an upwardly facing shoulder and a spring washer or other suitable resilient device is entrapped between the head shoulder 28 and the upset border 29 to lock the head 27 and screw 63 against axial movement while permitting the turning thereof. The upper border of the shank 64 is provided with a peripheral groove which is engaged by a stop defining split ring 30.

Longitudinally slidably telescoping the lower tubular section 52 is a second open topped cylinder defining tubular electrode 32 formed of metal and mating the inner peripheral face of the section 52. In order to restrict any relative axial rotation between the second electrode 32 and the tubular section 52 and hence between the first and second electrodes 57 and 32, the outer peripheral face of the electrode 32 has formed therein a flatted area 33 which extends longitudinally for the full length of the electrode 32 and longitudinally slidably abuts a confronting correspondingly shaped surface formed on the inner face of the tubular section 52. It should be noted that other suitable means may be provided for restricting the relative rotation of the electrode 32 and tubular section 52, such as for example, mating longitudinal ridges and grooves on the respective members, or the like.

An end wall 34 extends across the lower part of the cylinder electrode 32 and is provided with a tapped axial bore which engages the screw shank 64. In order to eliminate or minimize any backlash, a second cross plate or wall 35 of resilient material is spaced slightly below the end wall 34 and is affixed at one end thereof to the peripheral wall of the electrode 32. A tapped axial bore is formed in the wall 35 and likewise engages the screw shank 64. The upper inner edge 36 of the peripheral wall of the cylinder electrode 32 is curved and upwardly outwardly tapered.

The inside diameter of the cylinder electrode 32 may be equal to but is highly advantageously slightly less than the outside diameter of the dielectric coating of the first electrode 57. The impedance of the capacitor 49 is controlled by turning the screw 63 which adjusts the relative positions of the electrodes 32 and 57 continuously between a position of complete separation and maximum impedance, as shown in the drawing, and a position of minimum impedance with the piston electrode in full telescopic engagement with the cylinder electrode 32. The electrode tapered edges 36 and 58 function to expedite the smooth telescoping thereof, and when the electrodes are in telescopic engagement the dielectric coating 59 is under radial compression between the confronting faces of the electrodes 32 and 57. As a consequence, air gaps with the attendant loss of capacitance and non-linearities are eliminated and a firm association between the electrodes is effected. The variable capacitor 49, by reason of the firm support of the electrode 57 and 32, the former being rigidly carried by the body member 50 and the latter being slidably engaged with a minimum of play by the tubular section 52 and the screw 63, and there being a firm engagement between the telescopically related electrodes 57 and 32, and by reason of the resilient nature of the dielectric layer 59, is capable of withstanding great mechanical shock, high vibration and other adverse mechanical conditions without unfavorably effecting the stability, constancy, uniformity and other electrical characteristics of the capacitors.

Since the dielectric coating 59 may be very thin, of the order of 0.5 mil or less high value capacitor of miniature size is available. Lower values of maximum capacitance are available with greater thickness of the dielectric coating. The polyolefins, particularly the fluorinated polyolefins are preferable as the dielectric because of their low electric loss even at the very high frequencies, their high insulation resistance and dielectric strength as well as their low dielectric constant. Moreover, these materials are easily applied as thin uniform coatings, are stable under a wide range of conditions, and are non-abrasive, self lubricating, and of an excellent degree of resiliency and flexibility. By way of example, a variable capacitor of the construction described above having an overall diameter of 5/16 inch and an overall length of 7/8 inch had a capacitance variable from about 1.0 pf. to 65 pf. with a linearity of capacitance change of approximately ±5% and a Q factor in excess of 4000.

Another embodiment of the present invention is illustrated in FIGURE 3 of the drawing wherein the reference numeral 10 designates the novel trimmer capacitor which comprises a piston member 11 and a cylinder member 12. The piston member 11 includes a cylindrical metal core 13 which is precision formed by any suitable means. The peripheral face of the core 13 is coated with a layer 16 of a suitable dielectric material of uniform thickness which hugs and adheres to the face of the core 13. The dielectric material may be glass, ceramic, plastic or other suitable material and may be applied to the core 13 in any well known manner. The outer face of the dielectric layer 16 should be of accurate cylindrical configuration concentric with the core 13.

An annular collar 17 is affixed to the lower end of the core 13 and is externally threaded at its free end to define a mounting stud 14. A tubular member 18 of a suitable rigid insulating material is secured to the peripheral face of the collar 17 and projects upwardly from the collar 17 coaxial with the core 13. The tubular member 18 is provided with a threaded inner face 19.

The cylinder 12 is formed of metal includes a cylindrical wall 20 provided with an external thread engaging the inside thread of the tubular member 18 and a smooth inner face which uniformly slidably engages and contacts the face of the dielectric layer 16. The top of the cylinder 12 is defined by an end wall 21 having a screwdriver receiving diametric slot 22 formed therein. The stud 14 defines one of the capacitor terminals and the other terminal is defined by a conductor 23 passing through the wall of the tubular member 18 and terminating in a wiper or brush element 24 engaging the surface of the cylinder 12. The capacity of the condenser 10 is adjusted by turning the cylinder 12 by means of a screwdriver whereby to effect the axial movement thereof relative to the piston 11.

Referring now to FIGURE 4 of the drawing which illustrates another embodiment of the present invention, the improved capacitor 37 comprises a metal piston core 38 provided with an enlarged cylindrical base 39 coaxial with the core 38. An externally threaded first metal cylinder 40 snugly engages the base 39 and is rigid therewith and projects upwardly coaxial with the core 38 and has an inner surface spaced from the outer surface of the core 38. A uniform layer 41 of a dielectric material covers and is adherent to the outer face of the core 38.

A tubular body member 42 formed on an insulating material is internally threaded at its inner face and engages the upper threaded section of the cylinder 40. Nesting in the upper end of the body member 42 is an internally threaded metal collar 43. An adjustable tubular metal cylinder 44 having a uniform wall thickness is threaded along the outer face of its upper section, said threaded section engaging the threaded collar 43. The lower section of the adjusting cylinder 44 has a smooth outer face and is coated with a uniform layer 46 of dielectric material. The lower section of the cylinder 44 is sandwiched between the inner face of the dielectric layer 46 and the outer face of the dielectric layer 41, being in uniform contact and engagement with said faces. The terminals of the capacitor 37 are defined by the lower threaded end of the collar 40 and a metal lead element 47 connected to the metal bushing 43. Adjustment of the capacitor 37 is effected by the rotation of the cylinder 44 in any suitable manner.

It should be noted that the upper end of the cylinder 44 is provided with an end wall closure 48 so that the capacitor electrodes and dielectric are fully enclosed.

In FIGURE 5 of the drawing there is shown still another form of the present invention wherein the capacitor 65 includes an internally threaded shank 66 formed of an electrical insulating material, the lower end of the shank 66 defines a mounting pin. A metal annular collar 68 is rigidly affixed to the lower end of the shank 66 and supports an upwardly directed metal cylinder 69 coaxial with the shank 66 and terminates in a mounting stud 67. A tubular metal piston member 7 is internally threaded and engages the threaded shank 66, the outer face of the piston member 7 being uniformly spaced from the inner face of the cylinder 69. A layer 8 of dielectric material covers and is adherent to the outer peripheral face of the piston 7, the outer face of the layer 8 being in uniform engagement and contact with the inner face of the cylinder 69. An end wall 9 provided with a screwdriver receiving slot is formed at the upper end of the piston 7. Connections to the capacitor 65 may be made directly to the piston end wall 9 and to the outer face of the cylinder 69. Adjustment of the capacitor 65 is effected merely by turning the piston 7 relative to the threaded shank 66 so as to adjust the longitudinal position of the piston 7 relative to the cylinder 69.

In FIGURE 6 of the drawing, there is illustrated a variable capacitor 70 embodying the present invention and which is of the differential type. The capacitor 70 includes an annular metal member 71 provided with a depending mounting stud 72 having an axial bore formed therein. An insulating sleeve 73 has its lower end nesting in the base member bore and firmly secured thereto and an internally threaded metal tube 74 telescopes and is affixed to the sleeve 73. A tubular metal piston member 76 which defines a first electrode engages and is secured to outer face of the insulating sleeve 73 and is coated with a first adherent layer 77 of dielectric material.

A threaded rod or screw 78 at least partially formed of metal as at 79, registers with the threaded tube 74 and extends beyond opposite ends thereof. A first metal cylinder 80 defining a second or adjustable electrode firmly engages and is in snug slidable uniform contact with the outer face of the first dielectric layer 77 and includes an end wall 81 affixed to the inner end of the screw 78 and connected to the metal section 79. The outer peripheral face of cylinder 80 is coated with an adherent second layer 82 of dielectric material.

A tubular body member 83 of insulating material is affixed to and projects upwardly from the base 71 and has nesting and affixed in its upper end a second metal cylinder 84 defining a third electrode and having an end wall 86. The inside diameter of the cylinder 84 is equal to the outside diameter of the dielectric layer 82 so that a snug uniform sliding engagement and contact is effected therebetween upon the raising of the adjustable cylinder 80. It should be noted that the cylinders 80 and 84 and the piston 76, and the dielectric layers 77 and 82 are preferably so dimensioned, as is well known in the art, that the series capacity between the cylinder 84 and the piston 76 is independent of the position of the cylinder 80. The terminals of the capacitor 70 are defined by the cylinder 84, the stud 72 which is electrically connected to the piston 76 and the conductor section 79 which is electrically connected to the cylinder 80. As the screw 78 is turned, the relative position, between the cylinders 84 and 80 and between the cylinder 80 and the piston 76 are varied whereby to vary the capacitances between the cylinder 80 and the cylinder 84 and the piston 76 respectively in opposite senses.

The capacitors described above are characterized by their great stability under varying ambient conditions the uniformity and precision of adjustment, and a low size to capacitance ratio.

While there have been described and illustrated various embodiments of the present invention it is apparent that numerous alterations, omissions and additions may be made without departing from the spirit thereof.

What is claimed is:

1. A variable capacitor comprising a first tubular member formed of an insulating material, a second tubular member coaxial with and projecting from one end of said first tubular member, a cylindrical first electrode having a conducting face disposed within and coaxial with and rigidly supported by said first tubular member, a coating of dielectric material covering and adherent to said first electrode, a screw member coaxial with said tubular members and rotatably supported by said second tubular member and restricted against axial movement, a hollow cylinder second electrode coaxial with said second tubular member and axially slidably therein and having an inner diameter substatially equal to the outer diameter of said dielectric covered first electrode, a screw follower carried by said cylinder second electrode and engaging said screw, and means restricting the rotation of said cylinder second electrode.

2. A variable capacitor comprising a tubular body member including coaxial end to end first section formed of an insulating material and second section and first and second end walls closing the outer ends of said first and second sections respectively, a first electrically conducting cylindrical electrode disposed in and coaxial with said body member first section and rigidly supported by said first end wall, a screw disposed in and coaxial with said body member second section and journalled to said second end wall, a coating of dielectric material covering and adherent to the peripheral face of said first electrode, a tubular cylindrical second electrode coaxially disposed within and axially movable in said body member and in engagement with said first electrode and having an inside diameter approximately equal to the outside diameter of said dielectric coated first electrode, a screw follower carried by said second electrode and engaging said screw, and means restricting the rotation of said second electrode.

3. The variable capacitor of claim 2 wherein said dielectric coating comprises a non-polar polyolefin.

4. The variable capacitor of claim 2 wherein said dielectric coating disposed between the confronting faces of said first and second electrodes when in mutual engagement being under radial compression.

5. The variable capacitor of claim 2 wherein the means restricting the axial rotation of said cylinder electrode comprises an axially extending first flatted surface formed in the inner face of said second body member section and a second flatted surface extending axially along the outer face of said second electrode and mating and slidably abutting said first flatted surface.

6. The variable capacitor of claim 2 wherein said follower comprises a first transverse wall disposed at the outer end of said second electrode and having a tapped axial bore formed therein and engaging said screw.

7. The variable capacitor of claim 6 including a second transverse resilient wall disposed at the outer end of said second electrode and axially spaced from said first transverse wall and having a tapped axial bore formed therein engaging said screw.

8. A variable capacitor comprising a tubular body member, a first electrically conducting cylindrically shaped electrode axially disposed in and supported by said body member, a dielectric coating adherent to and covering the peripheral surface of said first electrode, a second electrically conducting tubular cylinder electrode axially disposed in and supported by said body member and insulated from said first electrode and having an inside diameter approximately equal to the outside diameter of said dielectric coated first electrode, means for adjusting the axial relationship of said first and second electrodes and means for restricting the relative rotation of said first and second electrodes.

9. A variable capacitor comprising a tubular body member, a first electrically conducting cylindrically shaped electrode axially disposed in and supported by said body member, a dielectric coating adherent to and covering the peripheral surface of said first electrode, a second electrically conducting tubular cylinder electrode axially disposed in and supported by said body member and insulated from said first electrode and having an inside diameter approximately equal to the outside diameter of said dielectric coated first electrode, and means for adjusting the mutual axial positions of said first and second electrodes in and out of relative telescoping positions, said dielectric material between the confronting faces of said telescoping first and second electrodes being under radial compression.

10. The capacitor of claim 9 wherein said dielectric is formed of a resilient material.

11. The variable capacitor of claim 9 wherein the outer peripheral border of said first electrode is radially inwardly tapered at the distal end thereof.

12. The variable capacitor of claim 9 wherein the inner peripheral border of said second electrode is radially outwardly tapered at the distal end thereof.

References Cited by the Examiner
UNITED STATES PATENTS 3,071,716  1/1963  Young _____ 317—249 X

FOREIGN PATENTS 1,048,351  1/1959  Germany.
648,228  1/1951  Great Britain.
865,462  4/1961  Great Britain.

JOHN F. BURNS, *Primary Examiner.*